Jan. 30, 1934.    F. JARDINE    1,944,935
PISTON
Filed Oct. 14, 1929
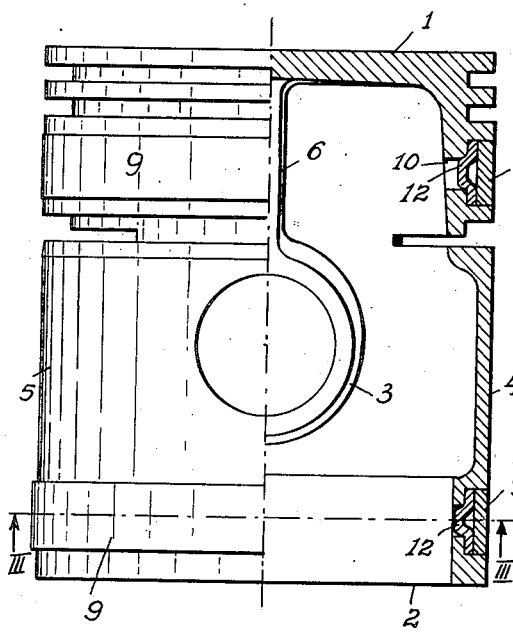
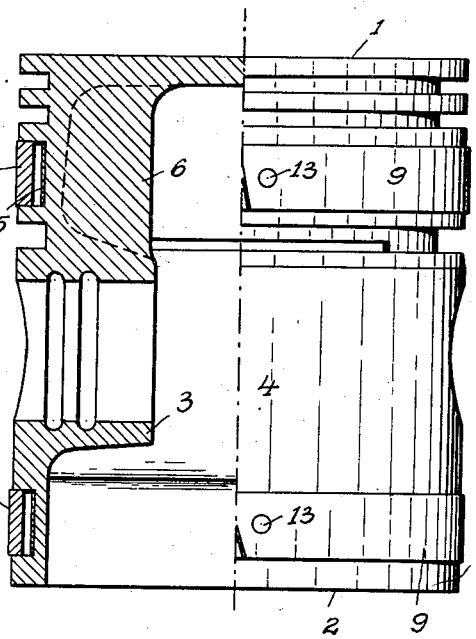
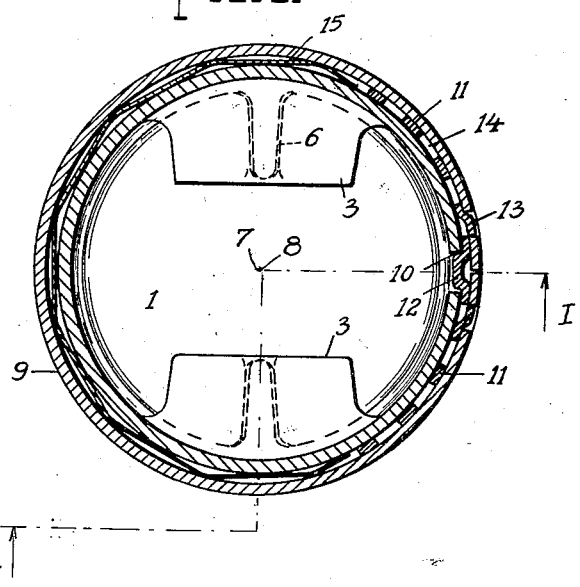
INVENTOR
FRANK JARDINE
BY Richey & Watts
ATTORNEY Patented Jan. 30, 1934

1,944,935

UNITED STATES PATENT OFFICE 1,944,935

PISTON

Frank Jardine, Cleveland, Ohio, assignor, by mesne assignments, to The Cleveland Trust Company, trustee, Cleveland, Ohio, a corporation of Ohio Application October 14, 1929. Serial No. 399,425

2 Claims. (Cl. 309—5)

This invention relates to pistons for internal combustion engines and more particularly to the type of piston in which means are provided for accommodating unhampered expansion of the pistons while minimizing piston slap, seizure and oil pumping. In pistons of the type to which this invention particularly relates, it has been customary heretofore to provide a piston composed of light metal alloy, such as aluminum, magnesium, or other suitable base alloys having a relatively high-coefficient of expansion as compared with that of the ordinary cast iron cylinders in which the pistons are to reciprocate; and having a skirt portion disposed eccentrically with respect to the head portion or the longitudinal axis of the piston so that one thrust side of the skirt would be adapted at all times to contact with the adjacent cylinder wall while the opposite thrust portion of the piston skirt would, when the piston was cold, be spaced from the cylinder wall a distance more or less closely approximating the distance through which the piston would expand when heated to operating temperatures. In such pistons, inexpansible split rings usually composed of cast iron have been disposed in one or more circumferentially extending grooves in the pistons, and the rings have been anchored in position in the grooves in outwardly projecting portions in the bottom surfaces of the grooves. Springs of various character were employed in the grooves between the pistons and the rings to locate the pistons within the rings. The configuration of these split ring grooves, the offsetting of the skirt and head relatively, and the type of means used to join the split ends of the rings, has been such that the cost of manufacturing such pistons has been prohibitively high from a commercial standpoint. Accordingly, it is with a refinement and improvement in such pistons for the purpose of rendering the invention of the previous construction commercially available that my present invention is particularly concerned.

Briefly, my invention comprises the provision of concentric head and skirt parts, of split ring grooves which are inexpensive to make, and of new and improved means for securing together the split ends of the rings; the grooves and ring end securing means embodying all the advantages of the prior construction and additional advantages which will be pointed out hereinafter.

In the drawing accompanying and forming a part of this application

Fig. 1 is a side elevation of a piston with parts broken away to show the ring holding means;

Fig. 2 is a side elevation of a piston with parts broken away and showing a section of the spring;

Fig. 3 is a transverse sectional view of the piston taken along the line 3—3 of Fig. 1.

Referring particularly to the drawing, in its preferred embodiment, the device comprises a piston having a body portion consisting of a head 1 and a skirt 2 in opposite walls of which latter there are disposed the wrist pin bosses 3. The skirt is provided with opposed thrust faces one of which 4 is preferably utilized as the explosion thrust face and 5 is preferably utilized as the face which takes the thrust on the upward stroke of the piston in the cylinder. The opposed thrust faces are preferably spaced from the head 1 as can be seen in the figures. Ribs 6 are disposed interiorly of the piston to reinforce the connection of the wrist pin bosses 3 with the piston head 1.

The piston is constructed preferably of metal having a low specific gravity as compared with iron such as aluminum, magnesium or their alloys or other suitable light metals or their alloys. Such a piston is more highly expansible than is cast iron of which cylinders are commonly constructed. The head 1 is preferably constructed in substantially smaller diameter than the walls of the cylinder in which it is to be used to permit freedom of movement of the piston within the cylinder at all temperatures.

The outer surfaces of the thrust portions of the skirt are formed concentric with respect to the outer surface of the piston head, that is, the head and skirt have common axes. The skirt is provided with a circumferentially extending recess, having a plane, regular or smooth bottom surface, that is, free from projections, which is adapted to receive the split ring 9. This groove is also concentric with the skirt and head. Ring 9 is formed of steel or other material having approximately the same coefficient of expansion as the material of the cylinder walls which latter are customarily formed of cast iron. Ring 9 is made larger in diameter than the piston skirt 2 and of a size to form a close sliding fit within the cylinder walls. Also the ring is formed of larger internal diameter than the base of the groove. In order to secure the split ring 9 within the groove the base of the groove upon the thrust face side 4 of the piston is provided with a recess 10.

Holding means 11 consisting of a stamped metal plate is disposed within the groove and is prevented from circumferential movement with respect to the skirt by means of a shouldered portion 12 which fits within the recess 10. The metal plate is provided with projections 13 which protrude outwardly therefrom into engagement with openings in the ends of the split ring and function to hold the ring ends together and the ring against circumferential movement. The metal plate can be provided with a plurality of openings 14 therein which serve to lighten the weight of the plate. A metal spring 15 is disposed in the groove between the split ring and the base of the groove laterally of the metal plate 11 and functions to maintain the portion of the split ring 9 adjoining the metal plate in engagement with the projections 13 and the ring in close fitting engagement with the cylinder with the ring projecting beyond the piston on the side of minimum thrust, that is, the left side of Fig. 1.

One or more split rings as just described can be utilized in the skirt if desired as shown in the figures. If desired the circumferentially disposed groove can be constructed so that it is relatively shallow on the explosion thrust side of the piston. By this construction the holding means for the split ring can be positioned in the relatively shallow portion of the groove but with its outer surface flush with the outer surface of the head or skirt and increased space thus can be obtained between the opposite side of the split ring and the base of the groove to permit of a larger spring being inserted therein.

In utilizing the device the piston is disposed in the cylinder preferably with the holding means 11 positioned upon the explosion thrust side of the cylinder and with the split ring 9 constituting a bearing surface for the top of the thrust face of the piston. As the piston becomes hot in use the metal thereof expands into the space between the thrust faces and the wall of the cylinder compressing the spring 15 and filling the space between the thrust face and the wall of the cylinder so that the thrust face 5 constitutes a bearing surface.

While a preferred embodiment of the invention has been shown and described it will be understood that modifications can be made therein within the scope of the appended claims.

I claim:

1. An internal combustion engine piston comprising a body portion, the outer surface of which is provided with a continuous circumferentially extending groove of uniform depth throughout and a radially extending recess in the bottom of the groove, a metal strip fitting in the groove against the base thereof and formed with a pressed-out tongue for interlocking engagement with the recess, a split ring of larger internal diameter than the base of the groove disposed in the groove and overlying said strip, interlocking means on the ends of said ring and on said strip for preventing separation of the ends of the ring, and an arcuate spring disposed in said groove beneath said ring and extending about the groove between and substantially in contact with the ends of said strip.

2. A piston comprising a body portion the outer surface of which is formed with a circumferentially continuous groove of uniform depth and an aperture through the wall of the body portion opening into the base of the groove, a split ring of larger internal diameter than the base of the groove positioned in the groove and having recesses adjacent the split, a metal strip disposed in the groove beneath the ring and having a pressed-out projection fitting within the aperture in the base of the groove and having upstruck tongues engaging and interlocking with the recesses in the ring, and an arcuate spring disposed in the groove beneath said ring and extending between the ends of said spring.

FRANK JARDINE.